United States Patent [19]

Shimp

[11] 4,447,586

[45] May 8, 1984

[54] METAL FLUOBORATE CATALYZED HINDERED AROMATIC AMINE CURING AGENTS FOR POLYEPOXIDE RESINS

[75] Inventor: David A. Shimp, Prospect, Ky.

[73] Assignee: Celanese Corporation, New York, N.Y.

[21] Appl. No.: 483,981

[22] Filed: Apr. 11, 1983

[51] Int. Cl.³ .................... C08G 59/50; C08G 59/68
[52] U.S. Cl. .................................. 525/504; 252/182; 528/91; 528/361; 528/407
[58] Field of Search ................ 525/504; 528/91, 361, 528/407; 252/182

[56] References Cited

U.S. PATENT DOCUMENTS

| | | | |
|---|---|---|---|
| 3,018,262 | 1/1962 | Schroeder | 260/29.2 |
| 3,432,440 | 3/1969 | Shimp et al. | 252/429 |
| 4,321,351 | 3/1982 | Zuppinger et al. | 528/91 |
| 4,366,108 | 12/1982 | Urech et al. | 264/137 |

*Primary Examiner*—Earl A. Nielsen
*Attorney, Agent, or Firm*—Herbert P. Price

[57] ABSTRACT

Curable compositions are made from polyepoxide resins and hindered aromatic diamines accelerated with copper fluoborate. Cured products obtained from these compositions are useful in oil well casings, geothermal piping, chemical piping and tankage, filament wound large composites and the like.

17 Claims, No Drawings

METAL FLUOBORATE CATALYZED HINDERED AROMATIC AMINE CURING AGENTS FOR POLYEPOXIDE RESINS

BACKGROUND OF THE INVENTION

The field of art to which this invention is directed is aromatic amine curing agents for polyepoxide resins, particularly hindered aromatic amines accelerated with metal fluoborates.

Aromatic amines are well known curing agents and are discussed in detail in many technical publications, e.g., "Epoxy Resins" by Lee and Neville (1957). Typical aromatic amines, used as curing agents, are meta-phenylene diamine, methylene dianiline and diaminodiphenyl sulfone. Such amines are solid compounds which must be heated when mixed with polyepoxide resins. Curing temperatures and curing times are relatively high and long but can be reduced somewhat with an accelerator, e.g., a phenolic compound, aliphatic amine or boron trifluoride amine complex.

The use of hindered aromatic amines as curing agents for epoxy resins is also knonw. U.S. Pat. No. 4,366,108 describes curable compositions made from a liquid epoxy resin, a hindered aromatic amine, namely, diethyltoluenediamine, and a curing accelerator. Typical accelerators are 1-methylimidazole, phenols, salicylic acid and boronfluoroamine complexes, such as $BF_3$-acetoacetanilide, $BF_3$-aniline complexes or $BF_3$-monoethylamine.

Metal fluoborates, or fluoborate salts, are known to be curing agents for polyepoxide resins as described in U.S. Pat. No. 3,432,440. The curing agent described in this patent is a mixture of a fluoborate salt, e.g., zinc fluoborate in aqueous solution; a carrier liquid, e.g., polyethylene glycol; and a hydrolyzable ester, e.g., triphenyl phosphite.

Various metal fluoborates are used to catalyze the curing of epoxy compounds in U.S. Pat. No. 3,018,262. Complex curing systems involving zinc fluoborate complexes, polyols and polycarboxylic acid anhydrides are described in U.S. Pat. No. 4,321,351.

SUMMARY OF THE INVENTION

This invention pertains to hindered aromatic amine curing agents for polyepoxide resins. In particular, this invention relates to polyepoxide resin curing agents made from hindered aromatic amines accelerated with a metal fluoborate. In another aspect, this invention pertains to curable compositions made from polyepoxide resins, hindered aromatic amines and copper fluoborate.

The curing agent compositions of this invention are made from (1) a sterically hindered aromatic diamine containing two primary amine groups attached directly to carbon atoms in the aromatic nucleus wherein the carbon atoms are not adjacent to each other and wherein each position ortho to each amine group contains an alkyl substituent having one to three carbon atoms and (2) copper fluoborate.

The hindered aromatic diamine curing agents are liquid or low melting solids and are much easier to incorporate into polyepoxide resin than conventional aromatic polyamines. These hindered aromatic diamines are relatively non-staining and low in toxicity as compared to the conventional aromatic polyamines.

Copper fluoborate is soluble in the hindered aromatic diamines and does not crystallize or precipitate out on standing. Boron trifluoride complexes with organic nitrogen-containing compounds have a tendency to crystallize from the amine solutions on standing.

The curing agent compositions of this invention in admixture with polyepoxide resins exhibit long pot life, develop a stable "B"-stage and are curable at relatively low temperatures for practical lengths of time. The cured compositions exhibit excellent chemical resistance, high heat distortion temperatures and high glass transition temperatures (Tg).

DESCRIPTION OF THE INVENTION

The hindered aromatic diamines useful in this invention are sterically hindered aromatic diamines containing two primary amine groups. The two primary amine groups are attached directly to non-adjacent carbon atoms in the aromatic nucleus. Each position ortho to each amine group contains an alkyl substituent having one to three carbon atoms. Preferred hindered amines are those wherein no more than one position ortho to each amine group contains a methyl substituent. Particularly preferred hindered amines are those wherein at least 3 of the positions ortho to the amine groups contain $C_2$ to $C_3$ alkyl substituents. These hindered aromatic diamines can be mononuclear or dinuclear. If dinuclear, one primary amine group is attached to each aromatic nucleus. Examples of such hindered aromatic diamines are diethyltoluenediamine (a mixture of 1-methyl-3,5-diethyl-2,4-diaminobenzene and 1-methyl-3,5-diethyl-2,6-diaminobenzene), 1,3,5-triethyl-2,4-diaminobenzene, 1-ethyl-3,5-diisopropyl-2,6-diaminobenzene, 1,3,4,6-tetramethyl-2,5-diaminobenzene, 1,4-dimethyl-3,6-diethyl-2,5-diaminobenzene, methylenebis(2,6-diisopropylaniline), methylenebis(2,6-diethylaniline), methylenebis(2-methyl-6-ethylaniline) and the like. The preferred hindered aromatic diamine is diethyltoluenediamine.

The metal fluoborate used in this invention is copper fluoborate. This fluoborate is available commercially as an aqueous solution generally at about 30 to about 50 weight percent solids. The aqueous solution of the copper fluoborate can be added to the hindered aromatic amine with a minimum of stirring to form a homogenous stable solution. This solution can be used as a curing agent for polyepoxide resins without removal of water. However, if desired, the water can be removed by heating the blend of amine and aqueous fluoborate solution to about 70° C. to about 90° C. while applying vacuum.

It has been found that copper fluoborate and hindered aromatic amines form stable solutions, i.e, solutions which remain clear and maintain reactivity, when stored at room temperature or elevated temperatures (50° C.). Solutions of copper fluoborate and hindered mononuclear aromatic amines are stable with or without the presence of water. When hindered dinuclear aromatic amines are catalyzed with copper fluoborate, it is necessary to remove water in order to solubilize the copper fluoborate and to maintain curing agent stability during storage. Other metal fluoborates either are not soluble in the hindered aromatic amine or, if soluble, do not form stable solutions when stored at room temperature or at elevated temperatures.

In preparing the curing agent of this invention, the copper fluoborate is added to the hindered aromatic amine in the amount of about 0.2 to about 5 weight percent copper fluoborate on solids basis, said percentage being based on the total weight of the two components. The preferred amount of metal fluoborate is about 0.5 to about 3 weight percent.

The polyepoxide resins useful in this invention are polyepoxides having more than 1 epoxy group per molecule, said epoxy group being a terminal epoxy group of the 1,2 or vicinal type. These polyepoxide resins can be liquid or solid in nature having viscosities as low as about 60 cps at 25° C. and melting points as high as 80° C. The useful polyepoxide resins are based on aromatic phenols, aliphatic polyols, polycarboxylic acids, aromatic or aliphatic polyamines and mixtures of these.

Among the aromatic phenolic polyepoxides useful in this invention are glycidyl polyethers of polyhydric phenols. Such polyepoxides are generally derived from a polyhydric phenol and an epihalohydrin and have epoxide equivalent weights of about 110 to about 500. Examples of the epihalohydrins are epichlorohydrin, epibromohydrin and epiiodohydrin, with epichlorohydrin being preferred. The polyhydric phenols are exemplified by resorcinol, hydroquinone, p,p'-dihydroydiphenyl methane, p,p'-dihydroxydiphenyl propane (or Bisphenol A as it is commonly called), p,p'-dihydroxybenzophenone, p,p'-dihydroxydiphenyl, p,p'-dihydroxydiphenyl ethane, bis(2-hydroxynaphthyl) methane, 1,5-dihydroxynaphthalene, phenolic novolacs and the like. These polyepoxide resins are well known in the art and are made by reacting the epihalohydrin in an amount at least equal to the phenolic hydrogen atoms, and, most preferably, in excess. Higher molecular weight polyepoxide resins are made by reacting lower molecular weight resins with additional dihydric phenol. The preferred polyepoxide resins are those based on Bisphenol A.

A second type of polyepoxide which is useful in this invention is a glycidyl polyester prepared by reacting an epihalohydrin, such as epichlorohydrin, with an aromatic or aliphatic polycarboxylic acid, such as ortho, meta or para phthalic acid, tetrahydrophthalic acid, hexahydrophthalic acid, adipic acid and the like. Such polyglycidyl esters and their preparation are described in U.S. Pat. No. 3,859,314, which is hereby incorporated by reference.

A third type of polyepoxide resin useful in this invention is a glycidyl amine made by reacting a polyamine with an epihalohydrin. Examples of such amines include aniline, ortho, meta and para toluidene, methylenedianiline, meta-xylylenediamine, 1,3-bis(aminomethyl) cyclohexane and the like. Such glycidyl amines and their preparation are described in U.S. Pat. Nos. 2,951,822 and 3,310,528 which are hereby incorporated by reference. Polyepoxides made from aminophenols are also useful in this invention. Such polyepoxides are described in U.S. Pat. No. 2,951,825 which also is incorporated by reference.

Additional polyepoxides useful in this invention are those polyepoxides made from an epihalohydrin and an aliphatic polyol, e.g., hydrogenated Bisphenol A, ethylene glycol, butanediol, trimethylolethane, trimethylolpropane, pentaerythritol and the like. Such polyepoxides are described in U.S. Pat. No. 3,033,803 which is hereby incorporated by reference.

In preparing the cured compositions of this invention, the hindered aromatic amine curing agent and the polyepoxide resin are reacted in the equivalent ratios of about 0.5 to about 1.5 amine hydrogen atoms to one epoxy group and, preferably, about 0.8 to about 1.2 amine hydrogen atoms per epoxy group.

The blend of curing agent and polyepoxide resin must be cured at elevated temperatures, e.g., 90° C. up to about 250° C. for a time sufficient to obtain a cured composition. Normally, the blends are heated at 90°–125° C. until the system gels (about 0.5 to 1.5 hours) and are cured for about 1 hour at 170°–180° C. Under high productivity conditions, the blends can be cured at 190°–195° C. in 5 minutes. If a low shrinkage system is desired, the blends are cured at 90°–100° C. for about 4 hours.

The cured compositions of this invention have high heat distortion temperatures and excellent resistance to water and steam. Unexpectedly, the ionic nature of the copper fluoborate does not increase the absorption of water and aqueous solutions. The water resistance and the resistance to aqueous chemical solutions of the copper fluoborate containing cured compositions are equal to or superior to cured compositions which do not contain the copper fluoborate accelerator.

Depending on the specific end uses, the curable compositions of this invention can contain non-alkaline fillers, fibers, thixotropes and pigments. Solvents can be used in some applications, particularly in fiber reinforced prepregs used in the manufacture of laminates and composites.

The compositions of this invention are useful in many applications, especially in uses which require stringent thermal and chemical resistance properties. Examples of such properties include oil well casings, geothermal piping, chemical piping and tankage, filament wound large composites, solventless prepregs and the like.

The following examples describe the invention in more detail. Parts and percentages unless otherwise indicated are parts and percentages by weight.

EXAMPLE 1

In a suitable container, 100 parts of the diglycidyl ether of Bisphenol A having an epoxide equivalent of 185 were mixed with a preblend of 24 parts of diethyltoluenediamine and 1.2 parts of a 40% aqueous solution of copper fluoborate (Example 1A). To another container were added and mixed 100 parts of the diglycidyl ether and 24 parts of diethyltoluenediamine (Example 1B).

The accelerating effect of copper fluoborate on the reactivity of the amine and the diglycidyl ether and the preservation of "B"-stage life were determined using Stroke Gel measurements. Stroke Gel determinations are made as follows: the solutions of diglycidyl ether and curing agent were poured into aluminum moisture dishes to a depth of 150 inch. The dishes and resin solutions were placed in a closed container and were left at room temperature. At periodic intervals, Stroke Gels of the solutions were determined by placing a small amount of the solution, sufficient to form a puddle about 1 cm. in diameter, on a cure plate set at a temperature of 150° C. A small spatula was pulled through the molten material and the time required to form a gel was recorded.

| Elapsed Time | Stroke Gel Time at 150° C. | |
|---|---|---|
| at R.T. | Example 1A | Example 1B |
| Initial | 4 minutes | 37 minutes |
| 1 Day | 4 minutes 10 seconds | 43 minutes |
| 3 Days | 3 minutes | 23 minutes |
| 6 Days | — | 16 minutes |
| 1 Week | 1 minute 20 seconds | — |
| 2 Weeks | 1 minute 25 seconds | 6 minutes |

-continued

| Elapsed Time at R.T. | Stroke Gel Time at 150° C. | |
|---|---|---|
| | Example 1A | Example 1B |
| 3 Weeks | 1 minute 5 seconds | 7 minutes |
| 4 Weeks | 1 minute | 5 minutes |
| 6 Weeks | 1 minute 5 seconds | 4 minutes 10 seconds |
| 2 Months | 55 seconds | 4 minutes 30 seconds |
| 3 Months | 40 seconds | 4 minutes |
| 4 Months | 30 seconds | 3 minutes 15 seconds |

EXAMPLE 2

To 23 parts of diethyltoluenediamine were blended 1.2 parts of a 40% aqueous solution of copper fluoborate. The resulting solution was then added with mixing to 100 parts of the diglycidyl ether of Bisphenol A having an epoxide equivalent weight of 185 (Example 2A). Another blend was prepared from 100 parts of the diglycidyl ether mixed with a solution of 23.5 parts of diethyltoluenediamine and 0.6 part of a 40% aqueous solution of copper fluoborate (Example 2B).

To a suitable reactor were added 100 parts of diethyltoluenediamine and 5 parts of a 40% aqueous solution of copper fluoborate. Vacuum was applied to the reactor and the temperature was raised to 80° C. The temperature was held at 80° C. under full vacuum, 30 inches Hg, until all the water had been distilled off. The resulting amine/fluoborate solution, 24.2 parts, was blended with 100 parts of the diglycidyl ether described above (Example 2C).

Brookfield viscosity at 25° C. was determined at specific intervals on portions of the blends which were stored at room temperature.

| Elapsed Time at R.T. | Brookfield Viscosity, cps | | |
|---|---|---|---|
| | Example 2A | Example 2B | Example 2C |
| Initial | 5,640 | 5,560 | 6,880 |
| 1 Hour | 7,480 | 7,280 | 12,860 |
| 2 Hours | 9,100 | 8,260 | 17,920 |
| 4 Hours | 18,600 | 13,280 | |
| 7 Hours | 47,200 | 23,200 | |
| 24 Hours | >>400,000 | >400,000 | |

Stroke Gel was determined on portions of the blends using the procedure described in Example 1.

| Elapsed Time at R.T. | Stroke Gel at 150° C. | | |
|---|---|---|---|
| | Example 2A | Example 2B | Example 2C |
| Initial | 4.5 minutes | 8.5 minutes | 4.25 minutes |
| 20 days | 1 minute | 1¾ minutes | Gelled |

The remainder of blends were vacuum deaired and were poured into molds preheated to 93° C. The molds and blends were heated at 93° C. until the resin gelled and at 177° C. for 1 hour. Example 2A gelled in 76 minutes at 93° C., Example 2B 99 minutes and Example 2C 72 minutes. The cured castings, after the regular cure of 1 hour at 177° C., were cut in half and half of each casting was postcured at 204° C. for 2 hours. The physical properties of the castings are listed below.

| | Example 2A | | Example 2B | | Example 2C | |
|---|---|---|---|---|---|---|
| Properties | Reg. Cure | Post Cure | Reg. Cure | Post Cure | Reg. Cure | Post Cure |
| HDT[1] (°C.) | | | | | | |
| Dry | 185 | 185 | 159 | 175 | 182 | 185 |
| Wet[2] | 155 | 156 | 141 | 154 | 153 | 158 |
| % H$_2$O Absorption[3] | 1.98 | 2.09 | 1.97 | 2.16 | 2.02 | 2.09 |
| Tensile Strength (psi) | 5686 | 6594 | 7196 | 7231 | 5996 | 6328 |
| Tensile Modulus (10$^6$ psi) | 0.39 | 0.41 | 0.38 | 0.38 | 0.38 | 0.38 |
| Tensile Elongation (%) | 1.5 | 2.1 | 2.4 | 2.8 | 1.8 | 2.0 |

[1]HDT — Heat Distortion Temperature - ASTM D-648 - 264 psi fiber stress load option.
[2]After conditioning at a relative humidity of >95% for 64 hours at 93° C.
[3]Determined after conditioning as described in 2.

EXAMPLE 3

Blends were made with the diglycidyl ether of Bisphenol A (DGEBA) having an epoxide equivalent weight of 185 and diethyltoluenediamine (DETDA) with and without copper fluoborate accelerator. These blends were deaired under vacuum and were poured into molds preheated at 121° C. The molds and blends were heated at the indicated temperatures until the blends gelled. The castings which contained no accelerator were cured for one hour at 177° C. and 2 hours at 204° C. The accelerator-containing castings were cured for one hour at 177° C.

| Example | 3A | 3B | 3C | 3D |
|---|---|---|---|---|
| DGEBA | 100 | 100 | 100 | 100 |
| DETDA | 25.3 | 28.9 | 25.3 | 28.9 |
| Cu(BF$_4$)$_2$ @ 40% in H$_2$O | | | 1.2 | 1.2 |
| Properties | | | | |
| Gel Time | 95 Min. | 87 Min. | 21 Min. | 16 Min. |
| Temperature °C. | 149 | 149 | 121 | 121 |
| HDT (°C.) | | | | |
| Dry | 170 | 152 | 174 | 155 |
| Wet | 144 | 133 | 143 | 129 |
| % H$_2$O Absorption | 1.86 | 1.80 | 1.74 | 1.66 |
| Tensile Strength (psi) | 7247 | 10,158 | 5570 | 5495 |
| Tensile Modulus (10$^6$ psi) | 0.36 | 0.34 | 0.25 | 0.26 |
| Tensile Elongation (%) | 3.0 | 5.4 | 3.1 | 2.9 |

EXAMPLE 4

One hundred parts of polyglycidyl diethyltoluenediamine having an epoxy equivalent weight of 118 were heated to 80° C. A preblend of 35.8 parts of diethyltoluenediamine and 1.36 parts of a 40% aqueous solution of copper fluoborate were added and formed a homogenous solution. The solution was deaired under vacuum and was poured into a mold preheated to 93° C. The mold and solution were heated at 93° C. until the solution gelled, a period of 47 minutes. The casting was then cured for 2 hours at 177° C. The casting was cut in half and one-half was post-cured for 2 hours at 204° C. The physical properties were then determined on the regularly cured and post-cured castings.

| Properties | Reg. Cure | Post-Cure |
|---|---|---|
| HDT (°C.) | | |
| Dry | 212 | 224 |
| Wet | 173 | 196 |
| % H$_2$O Absorption | 2.54 | 2.88 |
| Tensile Strength (psi) | 2974 | 1674 |
| Tensile Modulus (10$^6$ psi) | 0.47 | 0.51 |

-continued

| Properties | Reg. Cure | Post-Cure |
| --- | --- | --- |
| Tensile Elongation (%) | 0.6 | 0.3 |

EXAMPLE 5

To a suitable reactor were added 200 parts of methylene bis(2,6-diisopropylaniline) (MDPA). Heat was applied and at 78° C., 4 parts of a 40% aqueous solution of copper fluoborate solution were added. The temperature was held at 78°–81° C. under vacuum (30 inches Hg) for 16 minutes until all the water had distilled over. A clear solution of copper fluoborate in amine was obtained (Example 5A).

Another solution of copper fluoborate in methylene bis(2,6-diisopropylaniline) was made from 200 parts of MDPA and 10 parts of a 40% aqueous solution of copper fluoborate using the same procedure as described above (Example 5B).

Blends were prepared from the diglycidyl ether of Bisphenol A having an epoxide equivalent weight of 185 (DGEBA) with Example 5A, Example 5B and unmodified MDPA. Stroke Gels were determined on these blends using the procedure described in Example 1.

| Components | A | B | C |
| --- | --- | --- | --- |
| DGEBA, parts | 185 | 185 | 185 |
| Example 5A | 91.5 | | |
| Example 5B | | 91.5 | |
| MDPA | | | 91.5 |
| Stroke Gel (150° C.) | 38 min. | 4 min. 35 sec. | 69 min. |

EXAMPLE 6

To 50 parts of DETDA were added 5 parts of a 40% aqueous solution of copper fluoborate. The resulting blend was heated to 80° C., and vacuum (30 inches Hg) was applied to remove the water.

To 100 parts of DGEBA (epoxide equivalent weight of 185) were added 24.2 parts of the amine/accelerator solution. The resulting blend was poured into a mold preheated to 93° C. The mold and blend were heated at 93° C. for 72 minutes to gel the solution. The gelled casting was cured 1 hour at 177° C. and 2 hours at 204° C. (Example 6A).

Another casting was made from 100 parts of DGEBA and 24 parts of DETDA, heated at 93° C. for 3.5 hours to gel the solution and cured at 204° C. for 2 hours (Example 6B).

The cured castings were cut into strips, the strips were weighed and inserted into soft drink bottles containing the following aqueous solutions: 10% sulfuric acid, 10% sodium hydroxide, and 5% sodium hypochlorite. Sufficient liquid was in each bottle to cover about 80% of the castings. The bottles were capped and were placed in an oven heated to 93° C. At periodic intervals, the castings were removed from the bottles, were dried and weighed to determine weight gain or loss. Any change in appearance of the castings was noted.

Additional tests were conducted with distilled water and with ethanol using the procedure described above except the ethanol test was conducted at room temperature. Example 6A was also heated in air at 204° C. to determine its heat resistance.

| Example | 1 Day | 3 Days | 1 Week | 2 Weeks | 3 Weeks | 1 Month |
| --- | --- | --- | --- | --- | --- | --- |
| 10% $H_2SO_4$ Solution | | | | | | |
| 6A | +1.34 | +1.73 | +1.95 | +2.04 | +2.12 | +2.11 |
| 6B | +1.28 | +1.70 | +1.96 | +2.06 | +2.16 | +2.17 |
| 10% NaOH Solution | | | | | | |
| 6A | +1.19 | +1.57 | +1.83 | +1.82 | +1.81 | +1.85 |
| 6B | +1.12 | +1.51 | +1.78 | +1.83 | +1.86 | +1.94 |
| 5% NaOCl Solution | | | | | | |
| 6A | +1.33D | +1.61D | +1.82D | +1.89D | +1.89D | +1.89D |
| 6B | +1.25D | +1.68D | +1.98D | +2.06D | +2.11D | +2.10D |
| Distilled $H_2O$ | | | | | | |
| 6A | +1.38 | +1.80 | +2.03 | +2.10 | +2.14 | +2.09 |
| 6B | +1.37 | +1.80 | +2.06 | +2.17 | +2.22 | +2.20 |
| Ethanol | | | | | | |
| 6A | +0.14 | +0.27 | +0.50 | +0.76 | +0.93 | +1.10 |
| 6B | +0.21 | +0.39 | +0.82 | +1.25 | +1.59 | +1.93 |
| Air | | | | | | |
| 6A | −1.86 | −2.68 | −3.50 | −4.19Cr | −4.69Cr | −5.18CrW |

D — Dulled
Cr — Crazed
W — Warped

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A curing agent for polyepoxide resins comprising a solution of:
   (a) a sterically hindered aromatic diamine containing two primary amine groups attached directly to carbon atoms in the aromatic nucleus wherein the carbon atoms are not adjacent to each other and wherein each position ortho to each amine group contains an alkyl substituent having one to three carbon atoms; and
   (b) copper fluoborate ps wherein the copper fluoborate is present in the solution in the amount of about 0.2 to about 5 weight percent based on the weight of (a) and (b).

2. The curing agent of claim 1 wherein no more than one position ortho to each amine group in the hindered aromatic amine contains a methyl substituent.

3. The curing agent of claim 1 wherein at least three positions ortho to the amine groups contain $C_2$ to $C_3$ alkyl substituents.

4. The curing agent of claim 1 wherein the copper fluoborate is an aqueous solution containing about 30 to about 50 weight percent copper fluoborate.

5. The curing agent of claim 4 wherein the water is removed.

6. The curing agent of claim 1 wherein the copper fluoborate is present in the amount of about 0.3 to about 3 weight percent.

7. The curing agent of claim 1 wherein the hindered aromatic amine is diethyltoluenediamine.

8. The curing agent of claim 1 wherein the hindered aromatic amine is methylenebis(2,6-diisopropylaniline).

9. A curable composition comprising:
   (a) a sterically hindered aromatic diamine containing two primary amine groups attached directly to carbon atoms in the aromatic nucleus wherein the carbon atoms are not adjacent to each other and wherein each position ortho to each amine group contains an alkyl substituent having one to three carbon atoms;
   (b) copper fluoborate; and
   (c) a polyepoxide resin having more than one terminal 1,2-epoxy groups per molecule,
wherein the copper fluoborate is present in the amount of about 0.2 to about 5 weight percent based on the weight of (a) and (b) and wherein the hindered aromatic diamine and the polyepoxide resin are present in the equivalent ratios of about 0.5 to about 1.5 amine hydrogen atoms per 1 epoxy group.

10. The curable composition of claim 9 wherein no more than one position ortho to each amine group in the hindered aromatic amine contains a methyl substituent.

11. The curable composition of claim 9 wherein at least three positions ortho to the amine groups contain $C_2$ to $C_3$ alkyl substituents.

12. The curable composition of claim 9 wherein the copper fluoborate is an aqueous solution containing about 30 to about 50 weight percent copper fluoborate.

13. The curable composition of claim 12 wherein the water is removed.

14. The curable composition of claim 9 wherein the copper fluoborate is present in the amount of about 0.3 to about 3 weight percent based on the weight of (a) and (b).

15. The curable composition of claim 9 wherein the hindered aromatic amine is diethyltoluenediamine.

16. The curable composition of claim 9 wherein the hindered aromatic amine is methylenebis(2,6-diisopropylaniline).

17. The curable composition of claim 9 wherein the hindered aromatic diamine and the polyepoxide resin are present in the equivalent ratios of about 0.8 to about 1.2 amine hydrogen atoms per 1 epoxy group.

* * * * *